(12) United States Patent
Haney

(10) Patent No.: US 10,849,315 B2
(45) Date of Patent: Dec. 1, 2020

(54) ORIOLE BIRD FEEDER WITH TAPERED PORT ACCESS CHANNEL AND INTEGRATED PERCH

(71) Applicant: WOODSTREAM CORPORATION, Lititz, PA (US)

(72) Inventor: Luke Benjamin Haney, Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 0 days.

(21) Appl. No.: 16/419,489

(22) Filed: May 22, 2019

(65) Prior Publication Data

US 2019/0335716 A1 Nov. 7, 2019

Related U.S. Application Data

(63) Continuation of application No. 15/395,451, filed on Dec. 30, 2016, now Pat. No. 10,342,220.

(51) Int. Cl.
| | | |
|---|---|---|
| *A01K 39/01* | (2006.01) | |
| *A01K 39/02* | (2006.01) | |
| *A01K 39/04* | (2006.01) | |

(52) U.S. Cl.
CPC ...... *A01K 39/0113* (2013.01); *A01K 39/0106* (2013.01); *A01K 39/0206* (2013.01); *A01K 39/04* (2013.01)

(58) Field of Classification Search
CPC ..... A01K 39/00; A01K 39/0206; A01K 39/02
See application file for complete search history.

(56) References Cited

U.S. PATENT DOCUMENTS

| | | | | |
|---|---|---|---|---|
| 5,303,674 A | * | 4/1994 | Hyde, Jr. | A01K 39/00 |
| | | | | 119/77 |
| 5,640,927 A | | 6/1997 | Klein | |
| 5,682,835 A | * | 11/1997 | Walter | A01K 39/012 |
| | | | | 119/57.8 |
| 5,947,051 A | | 9/1999 | Geiger | |
| 5,947,054 A | * | 9/1999 | Liethen | A01K 39/0206 |
| | | | | 119/52.3 |
| 7,234,418 B2 | * | 6/2007 | Fort, II | A01K 39/0206 |
| | | | | 119/52.2 |
| 7,448,347 B2 | * | 11/2008 | Richmond | A01K 39/012 |
| | | | | 119/72 |
| 7,549,394 B2 | * | 6/2009 | Nock | A01K 31/12 |
| | | | | 119/52.3 |
| 7,685,969 B2 | * | 3/2010 | Stone | A01K 39/02 |
| | | | | 119/52.2 |
| 7,861,671 B2 | * | 1/2011 | Carter | A01K 39/026 |
| | | | | 119/57.8 |

(Continued)

*Primary Examiner* — Kristen C Hayes
(74) *Attorney, Agent, or Firm* — Barley Snyder

(57) ABSTRACT

An Oriole bird feeder having a nectar reservoir with a base and a tapered port, and preferably a tapered port/perch assembly, is provided. The bird feeder allows Orioles and other similarly sized members of the Icterid family of birds to land on the perch and access the nectar in the reservoir base while, due to the diminishing taper of the opening in the tapered port, simultaneously preventing average sized Italian, Carniolan and Caucasian honey bees from entering the reservoir base through the port to obtain the nectar where they subsequently become trapped and perish.

20 Claims, 14 Drawing Sheets

(56) References Cited

U.S. PATENT DOCUMENTS

| | | | |
|---|---|---|---|
| 7,874,264 B2* | 1/2011 | McMullen | A01K 39/0206 119/52.2 |
| 8,276,541 B2* | 10/2012 | LoRocco | A01K 39/02 119/72 |
| 8,522,717 B2* | 9/2013 | Carter | A01K 39/026 119/57.8 |
| 8,763,556 B1* | 7/2014 | Vaughn, Jr. | A01K 39/0206 119/52.2 |
| D727,574 S | 4/2015 | Schroeder | |
| 9,198,401 B2* | 12/2015 | Colvin | A01K 39/0206 |
| 2007/0272161 A1 | 11/2007 | Stone | |
| 2007/0289540 A1 | 12/2007 | Stone | |
| 2008/0257273 A1 | 10/2008 | Carter | |
| 2009/0255476 A1 | 10/2009 | Colvin | |
| 2010/0089330 A1* | 4/2010 | McMullen | A01K 39/012 119/52.3 |
| 2010/0192866 A1 | 8/2010 | McMullen | |
| 2010/0224132 A1 | 9/2010 | Gauker | |
| 2011/0011345 A1 | 1/2011 | LoRocco | |
| 2011/0297095 A1* | 12/2011 | Cruz | A01K 39/02 119/80 |
| 2014/0109835 A1* | 4/2014 | Colvin | A01K 39/0206 119/74 |
| 2014/0158056 A1* | 6/2014 | Vaughn, Jr. | A01K 39/0206 119/72 |
| 2015/0020742 A1* | 1/2015 | Faunce | A01K 39/0206 119/78 |
| 2015/0122186 A1* | 5/2015 | Donegan | A01K 39/0113 119/51.5 |
| 2017/0311575 A1* | 11/2017 | Kong | A01K 39/04 |

* cited by examiner ary application of U.S. application Ser.
No. 15/395,451, filed Dec. 30, 2016, and hereby claims the
priority thereof to which it is entitled.

BACKGROUND OF THE INVENTION

Field of the Invention

The present invention is related to the field of bird feeders and, more particularly, to an Oriole bird feeder having a tapered port design that enables Orioles and other birds in the Icterid family to feed on sugar-rich nectar while preventing the indirect death of honey bees due to entrapment in the port and/or nectar reservoir of the feeder.

Description of the Related Art

Orioles feed on sugar-rich nectar and therefore various feeder designs have been developed that allow the consumer to provide the birds with foods they like. Some feeders are designed to offer liquid nectar while others are configured to dispense jelly. Orange halves or slices are also a popular food item that may be used to draw Orioles for feeding. In the case of liquid nectar, existing Oriole bird feeders include feed ports sized to allow the birds to insert their beaks to access the sugar-rich nutrient held in a nectar reservoir. Honey bees are also drawn to the sugar and, due to the size of the ports, are able to enter the same to access the nectar. However, upon passing through the ports the bees often become trapped in the nectar reservoir, ultimately leading to their death.

Accordingly, a need exists for an Oriole bird feeder having ports that allow the birds to access the nectar in the reservoir while preventing the entrance of honey bees into the reservoir. A need also exists for an Oriole bird feeder that can be used to dispense not only nectar but also other food items such as jelly and oranges in a single feeder that can be easily disassembled and cleaned.

SUMMARY OF THE INVENTION

In view of the foregoing, the present invention is directed to a bird feeder having a nectar reservoir with a base and a port having a tapered access passageway, and preferably a tapered port/perch combination or assembly, that allows the species of bird targeted by the feeder type to land on the perch and be supported thereon while accessing the nectar in the reservoir base through the port passageway. The species of bird targeted by the feeder as disclosed herein is the Oriole as well as other birds in the Icterid family that feed on sugar-rich nectar. Therefore, while Orioles will be referred to specifically, it is to be understood that this term is intended to include the Icterid family of birds more generally, and particular Icterids of a size comparable to that of the Oriole and therefore adapted to feed through a port of the kind described herein.

The opening or access passageway in the port through which the nectar in the reservoir base is accessed is inwardly tapered as it approaches the nectar in the base. This taper mimics the decreasing diameter of the Oriole's beak and allows the bird to insert its beak to a point closer to the reservoir and then, when the size of the opening has become too small for further beak insertion, to extend its tongue to withdraw nectar from the reservoir base to feed.

When birds are not present at the feeder, honey bees or other insects of similar size are drawn to the sugar in the nectar. These honey bees are prevented from entering the reservoir base due to the diminishing size of the tapered access passageway nearest the reservoir. As will be described hereinafter, the size of the port opening adjacent the reservoir base in accordance with the present invention is aimed at preventing the ingress of average-sized Italian, Carniolan and Caucasian honey bees. A feeder of similar design could be developed for other insect sizes and bird types depending on the geographic location of use and the indigenous species.

The port/perch assembly is removably secured to a mounting structure in the top cover of the reservoir base, preferably with a snap fit, and is held in place with sufficient strength to support the weight of a bird while yet enabling the port to be readily separated from the base for cleaning and then re-attached for use. While the port/perch assembly is preferred, the perch does not have to be connected to the port but could be a separate component without reducing the effectiveness of the tapered port in preventing unwanted insect access to the reservoir base in accordance with the present invention. Therefore, as used herein in the following description, excluding the claims, the term "port" is intended to include the port/perch assembly as well as a port component that is separate from the perch unless otherwise specified in the description.

In addition to its use as an access point for nectar, the port may also be used as a base mounting element for auxiliary food dispensing attachments by which the feeder may be adapted to offer other types of food items such as jelly and/or orange or other citrus slices. When the port is used as a base mounting element, the auxiliary food dispensing attachments are removably secured thereto with a connecting element that interlocks with the port/base mounting element in such a way that the attachments will not disconnect from the feeder while in use but, at the same time, will allow the consumer to easily remove them from the port/base mounting element for cleaning. Representatively, the auxiliary food dispensing attachments include a bowl or cup for holding jelly and a prong or spear upon which citrus halves or slices may be secured; other food dispensing attachments could be accommodated so long as such attachments are provided with a comparable connecting element to attach to the port/base mounting element.

According to another aspect, the perch/port assembly of the present invention is preferably configured to rotate around the mounting structure in the top cover between an extended feeding orientation and a compact storage orientation for packaging and retail display purposes. In the extended feeding orientation, the perch extends outwardly from the reservoir base on the order of about 1.5 inches or more to accommodate the average Icterid-size bird supported on the perch while feeding through the port. When rotated for packaging/retail purposes to the compact storage orientation, the perch fits within the outermost footprint or diameter of the base of the nectar reservoir.

Also according to the present invention, when the port/perch assembly is in the extended feeding orientation, the perches extend as far as possible without breaking the bottom-most plane of the feeder. In this way, a small gap resides between the bottom-most plane and a support surface upon which the feeder may be placed such that, when on the support surface, the entire weight of the feeder rests on the bottom surface of the reservoir base and does not rest upon the port/perch assembly. In addition to diverting weight from the port/perch assembly, the foregoing structure also helps to protect the port/perch assembly from damage should the feeder drop vertically from its attachment while hanging during use as the brunt of the impact on the feeder upon hitting the ground will be taken by the base and not the port/perch assembly.

Accordingly, it is an object of the present invention to provide an Oriole bird feeder having at least one port with an opening or access passageway that tapers downwardly toward the nectar reservoir to allow an Oriole to insert its beak to a point and then, when further insertion is not possible due to the diminishing size of the opening, to extend its tongue into the reservoir base to access the nectar therein.

Another object of the present invention is to provide an Oriole bird feeder in accordance with the preceding object in which the size of the port opening where the Oriole must use its tongue to reach the reservoir is too small for the average Italian, Carniolan and Caucasian honey bee to pass through the opening and into the reservoir base.

A further object of the present invention is to provide an Oriole bird feeder in accordance with the preceding objects in which the port may also be used as a base mounting element for auxiliary food dispensing attachments by which the feeder may be adapted to offer additional types of food items, other than just liquid nectar, such as jelly and/or orange or other citrus slices.

A still further object of the present invention is to provide an Oriole bird feeder in accordance with the preceding objects in which the auxiliary food dispensing attachments are configured with a connecting element that interlocks with the port/base mounting element in such a way that the attachments will not be disconnected by an Icterid-sized bird while the feeder is in use and, at the same time, also allow the consumer to easily remove them from the port/base mounting element for cleaning.

Yet a further object of the present invention is to provide an Oriole bird feeder in accordance with the preceding objects in which the tapered port is part of a port/perch assembly that is removably attached to a mounting structure of complementary configuration in a top cover of the base of the nectar reservoir with a snap fit.

Another object of the present invention is to provide an Oriole bird feeder in accordance with the preceding objects in which the port/perch assembly is rotatable on the mounting structure between an extended feeding orientation and a compact storage orientation for packaging and retail display purposes.

Yet another object of the present invention is to provide an Oriole bird feeder in accordance with the preceding object in which, in the extended feeding orientation, the perch projects outwardly from the reservoir base on the order of about 1.5 inches to accommodate the average Icterid-size bird supported on the perch while feeding through the port and, when rotated for packaging/retail purposes to the compact storage orientation, the perch fits within the outermost footprint or diameter of the reservoir base.

Still another object of the present invention is to provide an Oriole bird feeder in accordance with the preceding objects in which, when the port/perch assembly is in the extended feeding orientation, the perches extend as far as possible without breaking the bottom-most plane of the feeder, thus leaving a small gap between the bottom-most plane and a support surface upon which the feeder may be placed such that, when on the support surface, the entire weight of the feeder rests on the bottom surface of the reservoir base and does not rest upon the port/perch assembly.

A further object of the present invention is to provide an Oriole bird feeder in accordance with the preceding objects that is economical to manufacture and easy to use and that enables the consumer to customize the feeder to accommodate particular feed types and birds.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
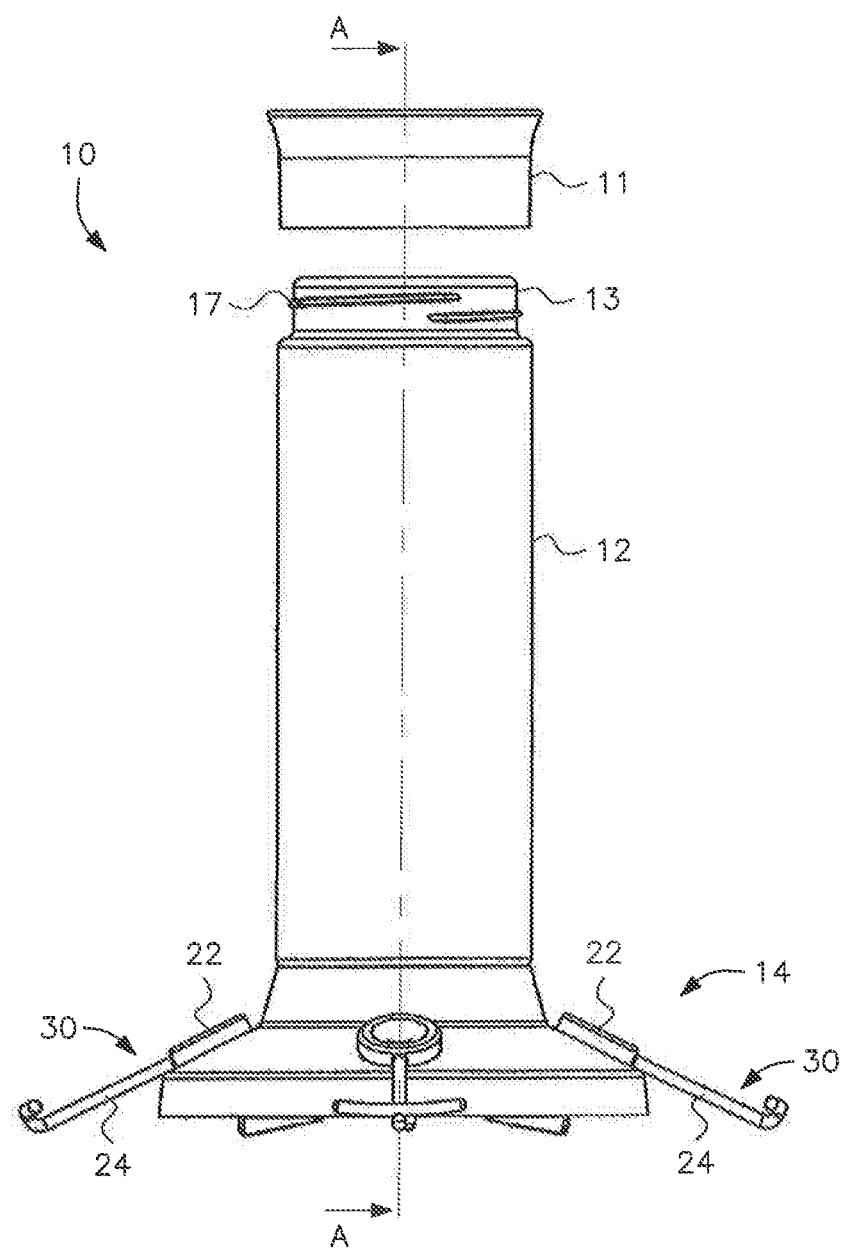
FIG. 1 is a side view of an Oriole bird feeder having four ports in accordance with the present invention, and with the lid removed to show the closed top of the reservoir.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1A:
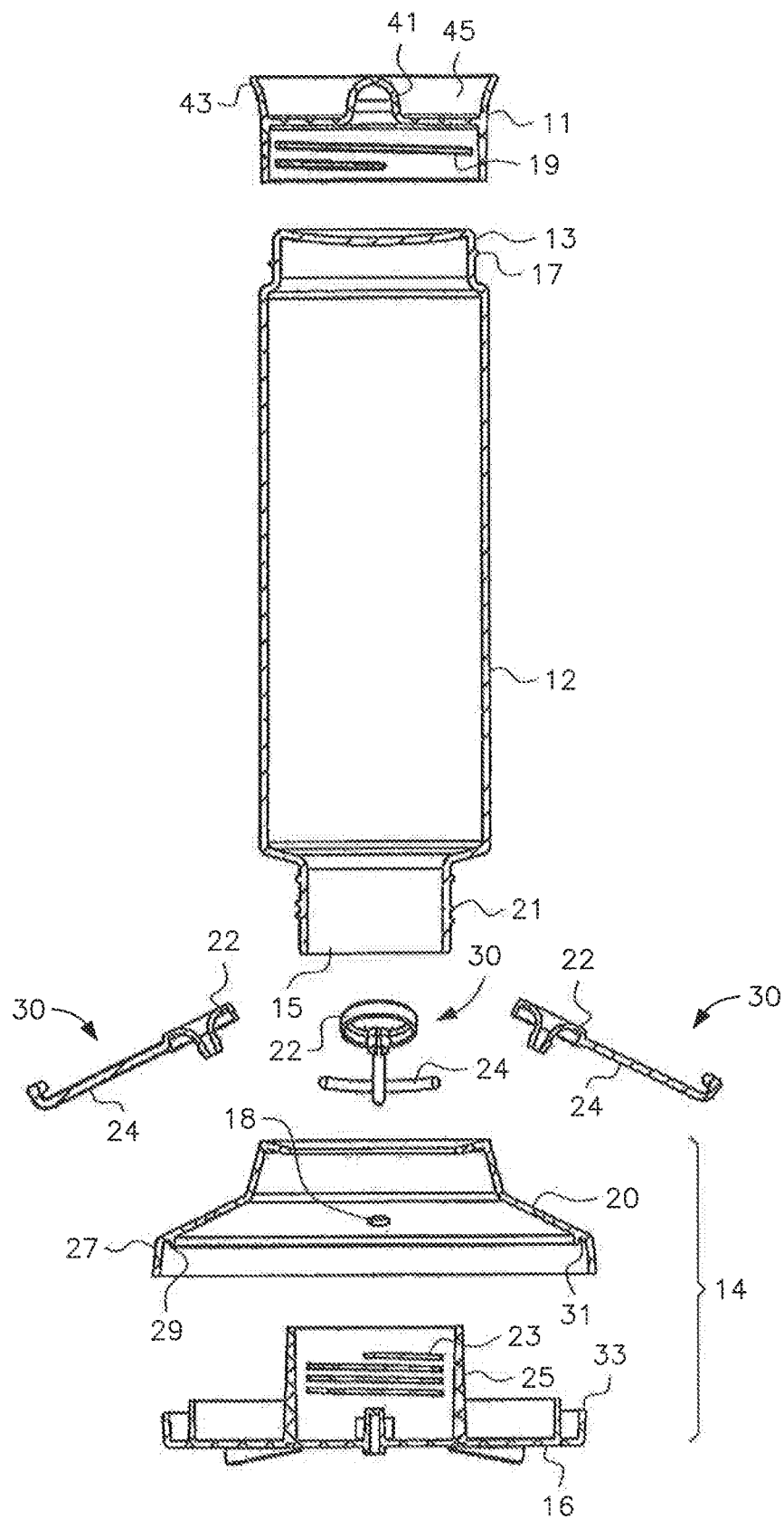
FIG. 1A is an exploded view of the components of the feeder shown in FIG. 1 as taken along line A-A thereof.
Figure 1B:
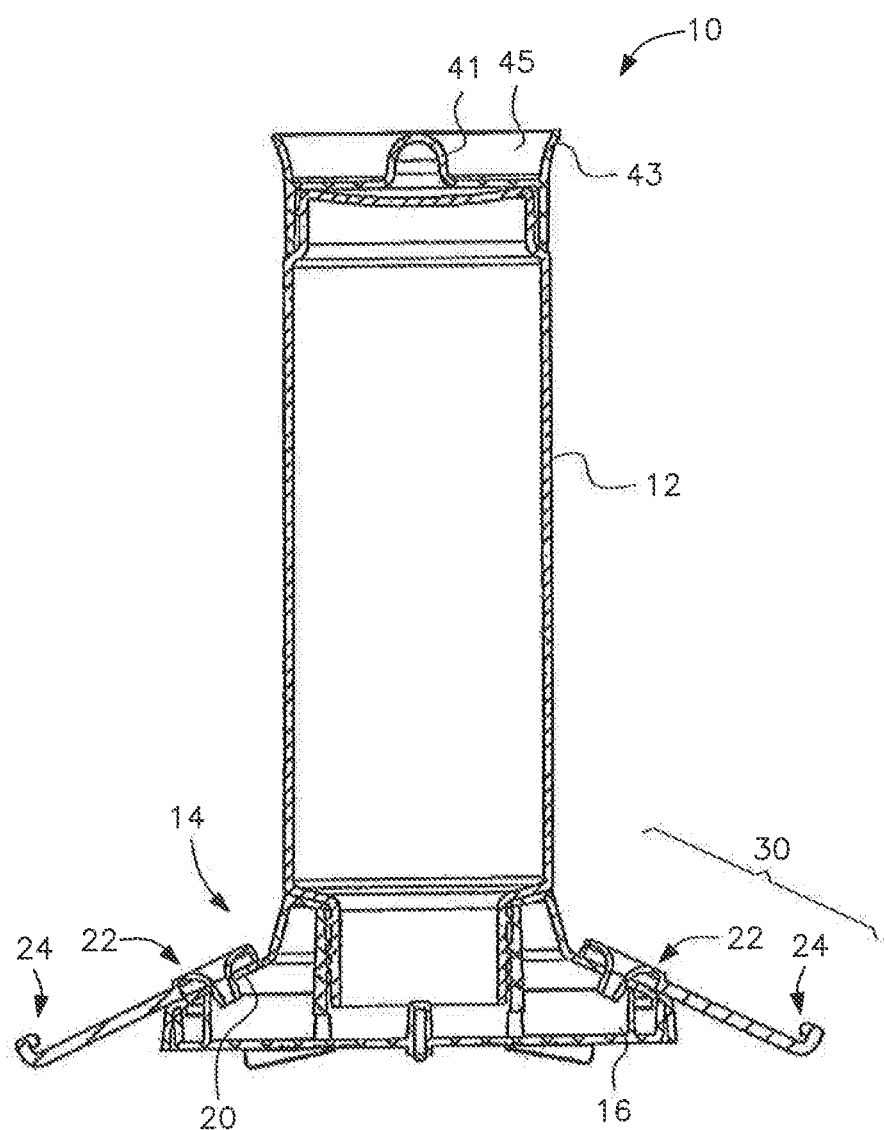
FIG. 1B is an assembled view of the feeder components shown in FIG. 1A.
Figure 2:
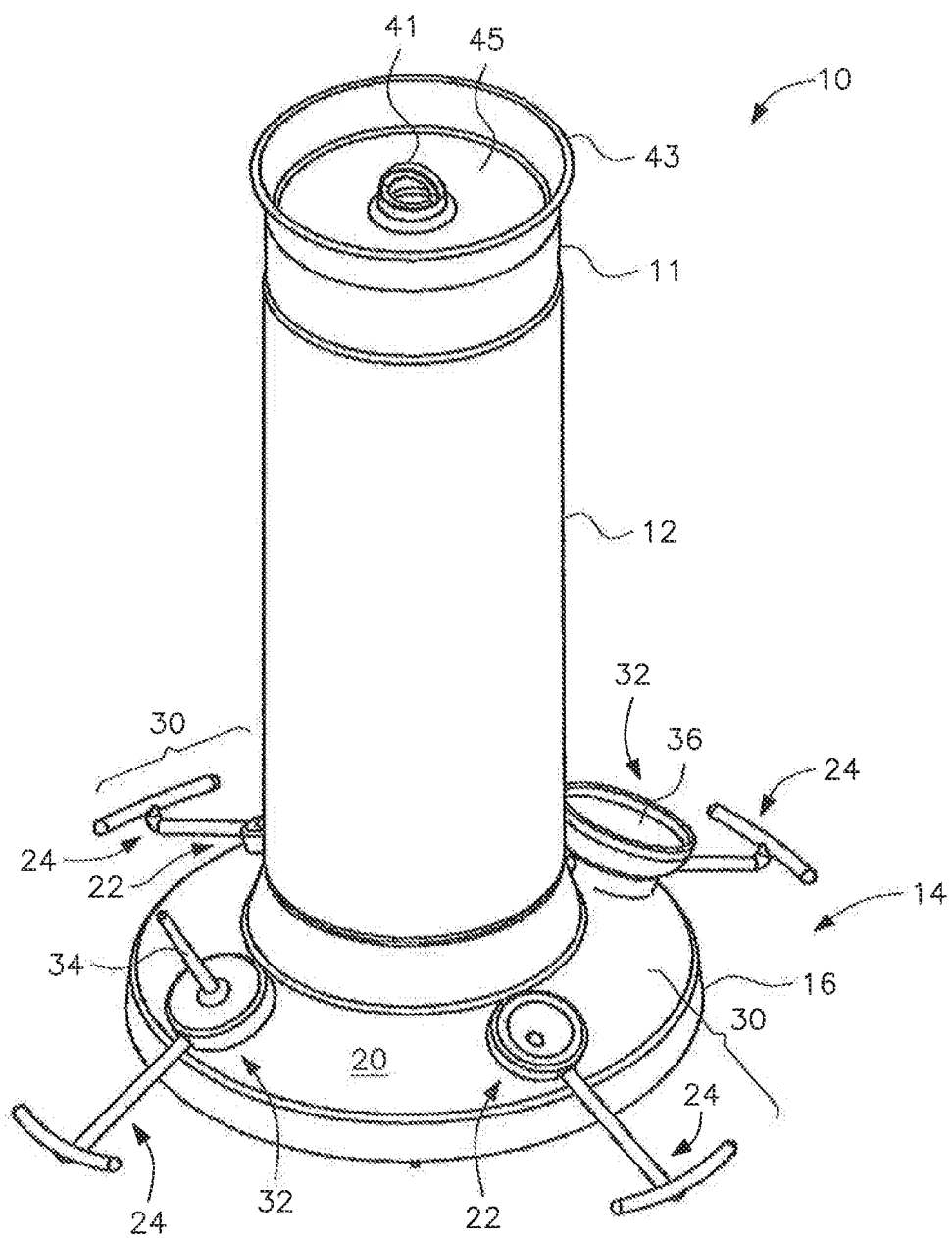
FIG. 2 is a perspective view of an Oriole bird feeder having auxiliary food dispensing attachments in accordance with a preferred embodiment of the present invention.
Figure 3:
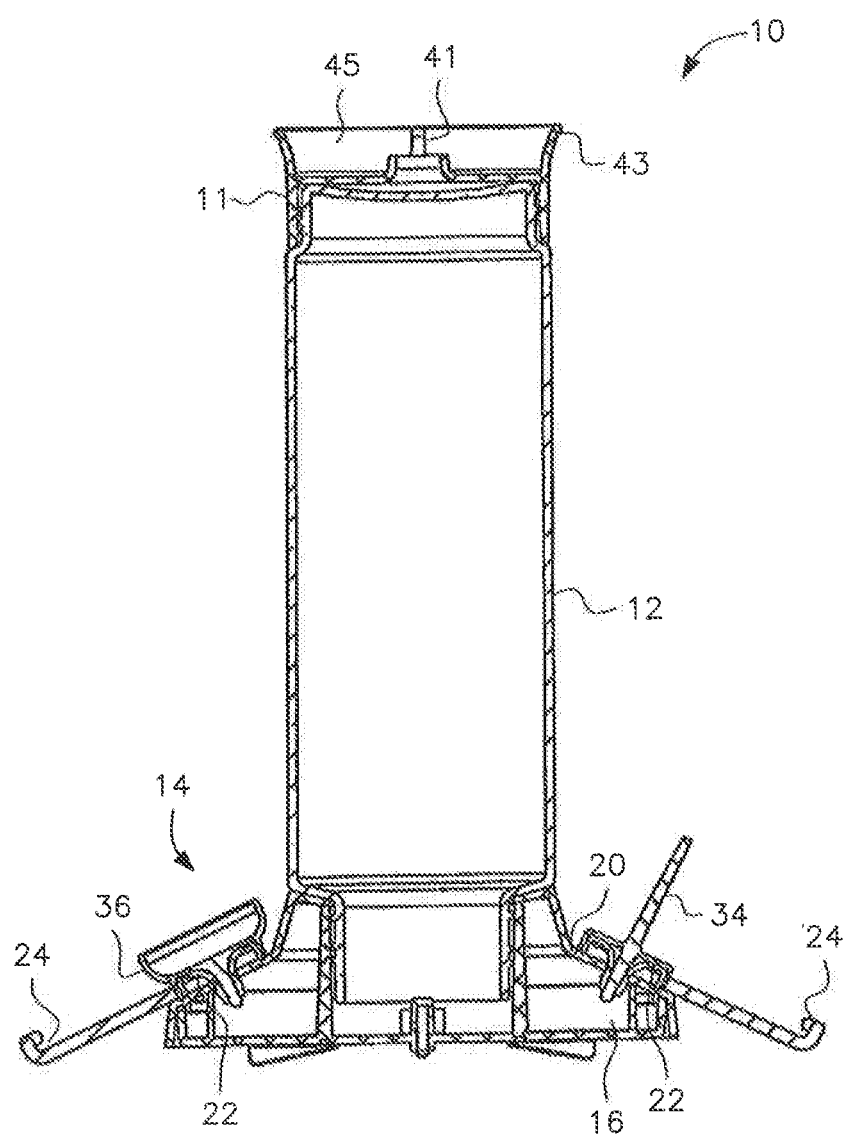
FIG. 3 is a cut-away side view of the bird feeder shown in FIG. 2, showing two different types of auxiliary food dispensing attachments on opposing sides of the feeder including a citrus slice prong and a jelly cup.
Figure 4:
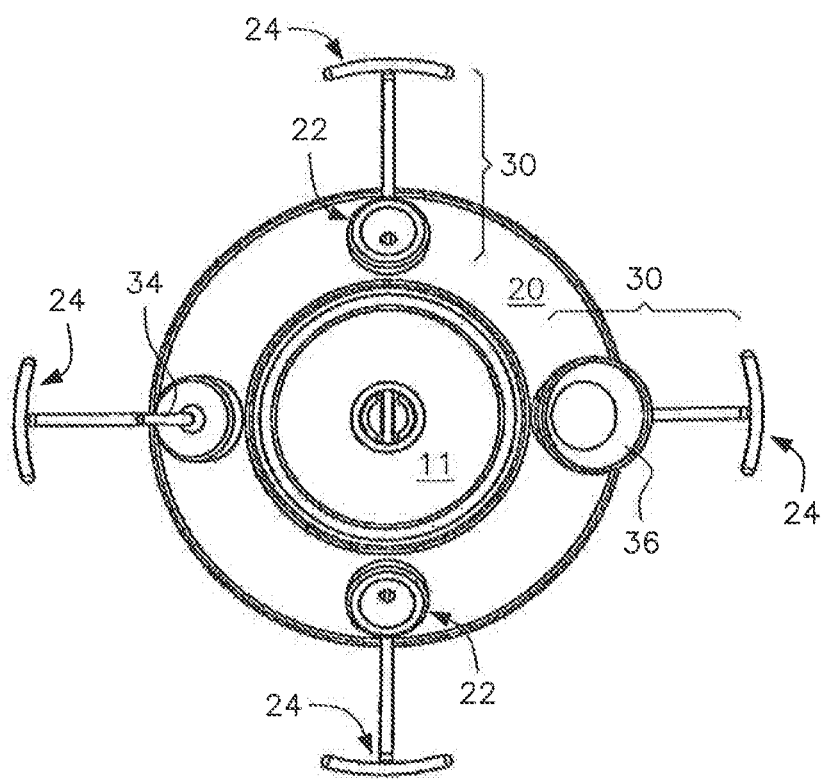
FIG. 4 is a top view of the bird feeder shown in FIG. 2 with the port/perch assemblies in the extended feeding orientation.
Figure 5:
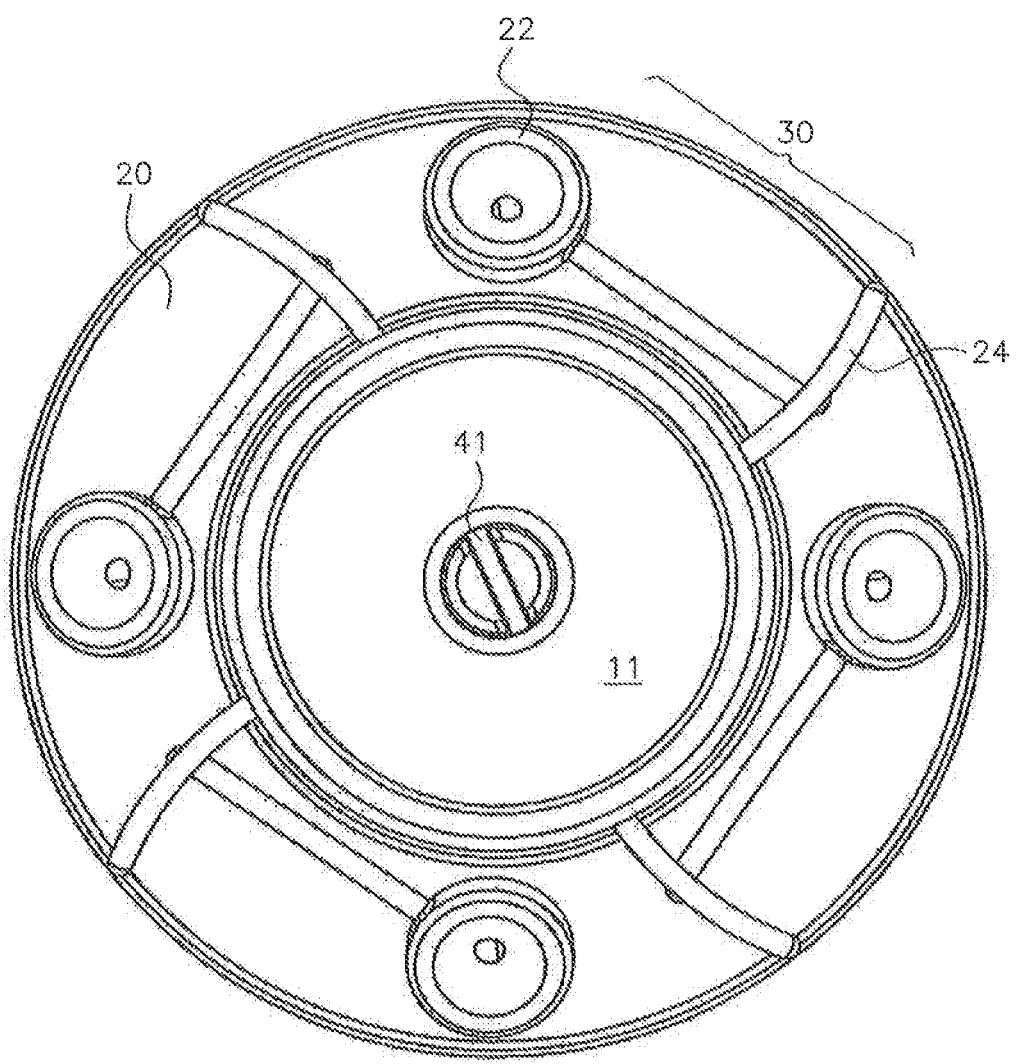
FIG. 5 is a top view of a bird feeder having four port/perch assemblies like that shown in FIG. 1, with the assemblies rotated to the compact storage orientation.

As shown in FIGS. 1, 1A, 1B and 2-5, the present invention is directed to an Oriole bird feeder generally designated by reference numeral 10. The feeder 10 includes a nectar reservoir 12 with a lid 11, a feeder base generally designated by reference numeral 14 having a nectar holding basin 16 and a top cover 20. The basin 16 is in communication with the reservoir 12 and the cover 20 has a plurality of port mounting apertures 18 (see FIG. 1A). A plurality of port elements generally designated by reference numeral 22 are removably attachable to the port mounting apertures 18. In the embodiment shown, each port element 22 is integrated with a perch 24 to create a port/perch combination or assembly generally designated by reference numeral 30. The port elements 22 not only provide openings through which birds can access the nectar in the basin 16 but also are configured to act as base mounting elements for auxiliary food dispensing attachments generally designated by reference numeral 32 (see FIG. 2). As shown in FIGS. 2-4, these auxiliary food dispensing attachments 32 may include a citrus spear 34 and a jelly bowl 36. The auxiliary food dispensing attachments are movably attachable to the port/base mounting elements 22 as will be further described hereinafter.

As shown in FIGS. 1A and 1B, the nectar reservoir 12 has a closed top end 13 and an open bottom end 15 through which the reservoir is filled with nectar. The closed top end 13 enables a vacuum to be created in the reservoir when the feeder is in use as is known in the art of hummingbird feeders. The closed top end 13 has external threads 17 to engage with internal threads 19 in the lid 11. The lid 11 preferably has an element 41 which is used to hang the feeder. The hanging element 41 may be recessed as shown, with upwardly extending edges 43 of the lid creating a bowl area 45 that can serve as an ant moat as is known in the art of hummingbird feeders.

The top cover 20 fits down on top of the basin 16 to form the feeder base 14 (see FIG. 1B). Adjacent the outer perimeter 27 of the top cover 20 is an inner lip 29 that defines a channel 31. The upwardly directed edge 33 on the basin 16 is received within the channel 31 when the top cover 20 and basin are coupled together. When the reservoir is connected to the base 14 to assemble the feeder, the external threads 21 on the bottom end 15 of the reservoir engage with internal threads 23 in a collar 25 formed in the basin 16. As the reservoir 12 is tightened into the collar 25, the cover 20 is pressed downwardly against the basin 16 to bring the edge 33 into leak-resistant engagement with an inner surface of the channel 31 when the feeder is in use.

Isolated views of the port/perch assembly 30 are set forth in FIGS. 6 and 6A-6D. The assembly 30 includes a port element 22 and a perch 24 having an extending member 40 and a bird support member 42 transverse to the extending member. The length of the extending member 40 is generally between about 1.5 inches and about 2 inches to accommodate the average Icterid size bird when feeding while perched on the bird support member 42. At the same time the length is short enough that when the perch is rotated for packaging/retail purposes, the perch 24 does not break an outermost footprint 44 (see FIG. 5) of the base and/or reservoir.

Figure 6:
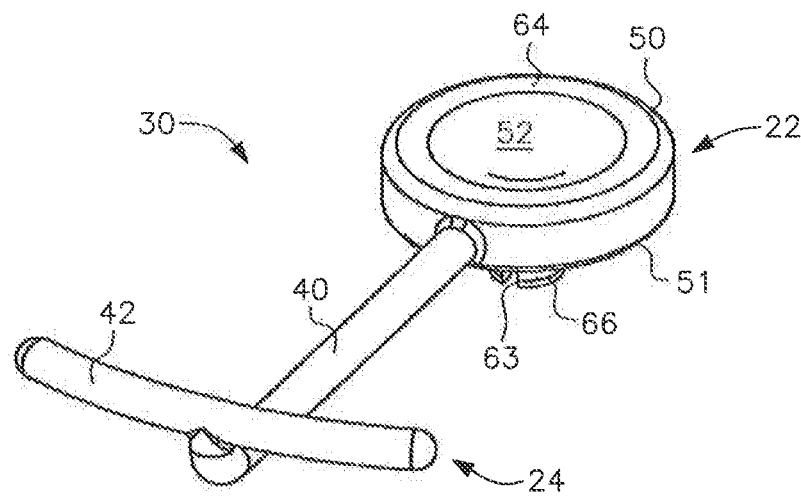
FIG. 6 is a perspective view of one of the port/perch assemblies of the feeder shown in the foregoing figures.
Figure 6A:
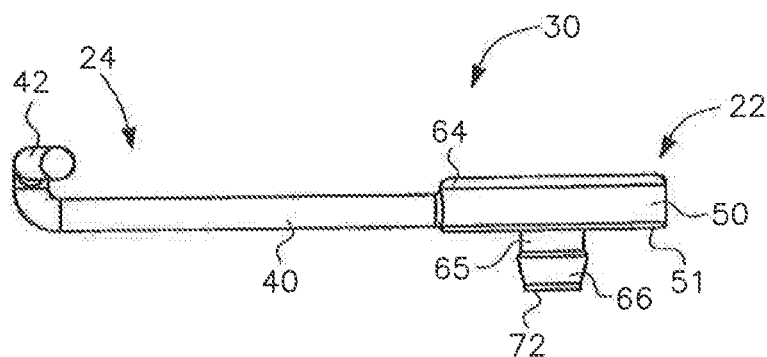
FIG. 6A is a side view of the port/perch assembly shown in FIG. 6.
Figure 6B:
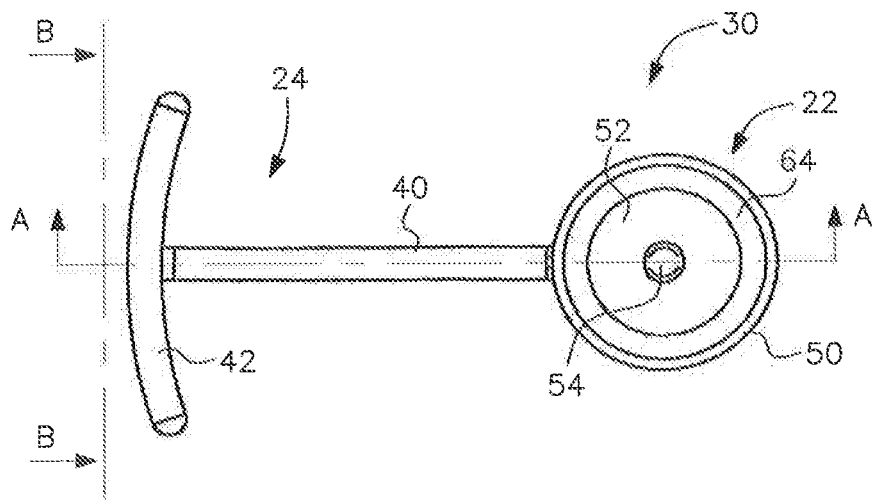
FIG. 6B is a top view of the port/perch assembly shown in FIG. 6.
Figure 6C:
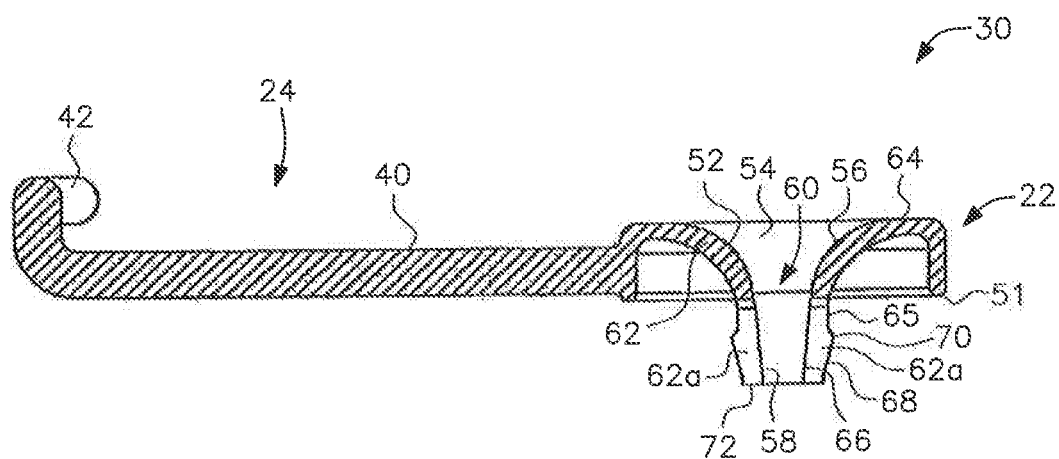
FIG. 6C is a cut-away view of the port/perch assembly taken along line A-A of FIG. 6B.

The port element 22 includes a generally disc-shaped body 50 with a convex upper surface 52 and a center aperture 54 that defines a downwardly tapered access passageway generally designated by reference numeral 60. As shown in FIG. 6C, the tapered access passageway 60 is defined by an inwardly and downwardly curved, generally cylindrical wall 62 that extends from an upper edge 64 of the body 50 to a distal end 66 that is inside the base 14 when the port element 22 is secured in the port mounting aperture 18 with a middle shank 65 thereof engaged in the aperture 18. The distal end 66 of the wall 62 has an axially directed relief cut 63 (see FIG. 6D) that divides the wall into two sides 62a, 62b that are squeezed toward one another when the distal end is pushed through the aperture 18 to secure the body 50 with a lower edge 51 of the body 50 being adjacent the base top cover 20.

Figure 6D:
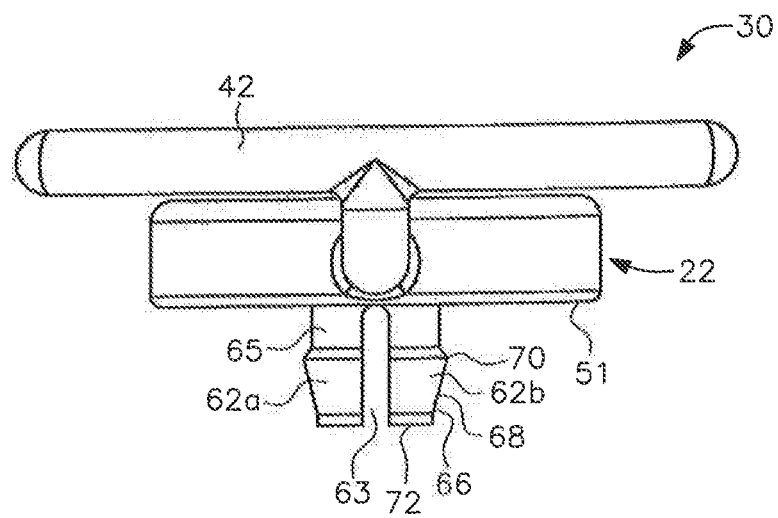
FIG. 6D is an enlarged end view of the port/perch assembly taken along line B-B of FIG. 6B.

The outer surface 68 of the wall distal end 66 just below the shank 65 includes a ridge 70. Once the distal end 66 is squeezed through the aperture 18 until the shank 65 is positioned in the aperture 18 and the ridge 70 is positioned against an underside of the top cover 20 of the base, preferably with a snap fit, the ridge prevents the port element 22 from falling out of the aperture 18. The outer surface 68 of the wall 62 below the ridge 70 is also preferably tapered toward a bottom edge 72 of the distal end, as shown in FIGS. 6C and 6D, to make it easier to insert the port element 22 into the aperture 18.

The tapered access passageway 60 has a diminishing size from an outer end generally designated by reference numeral 56, which is preferably flared as shown, to an inner end 58 adjacent the bottom edge 72 (see FIG. 6C). The diameter of the outer end 56 is between about 0.65 inches and about 0.70 inches, and preferably is about 0.68 inches, allowing an Icterid-sized bird to insert its beak therein, while the inner end 58 is too small for the beak, requiring the bird to use its tongue to reach into the basin. The reduced diameter of the inner end 58 also prevents honey bees from passing through the tapered access passageway 60 and into the basin, and is generally on the order of between about 0.125 inches and about 0.15 inches, and is preferably about 0.14 inches.

Figures 7, 7A:
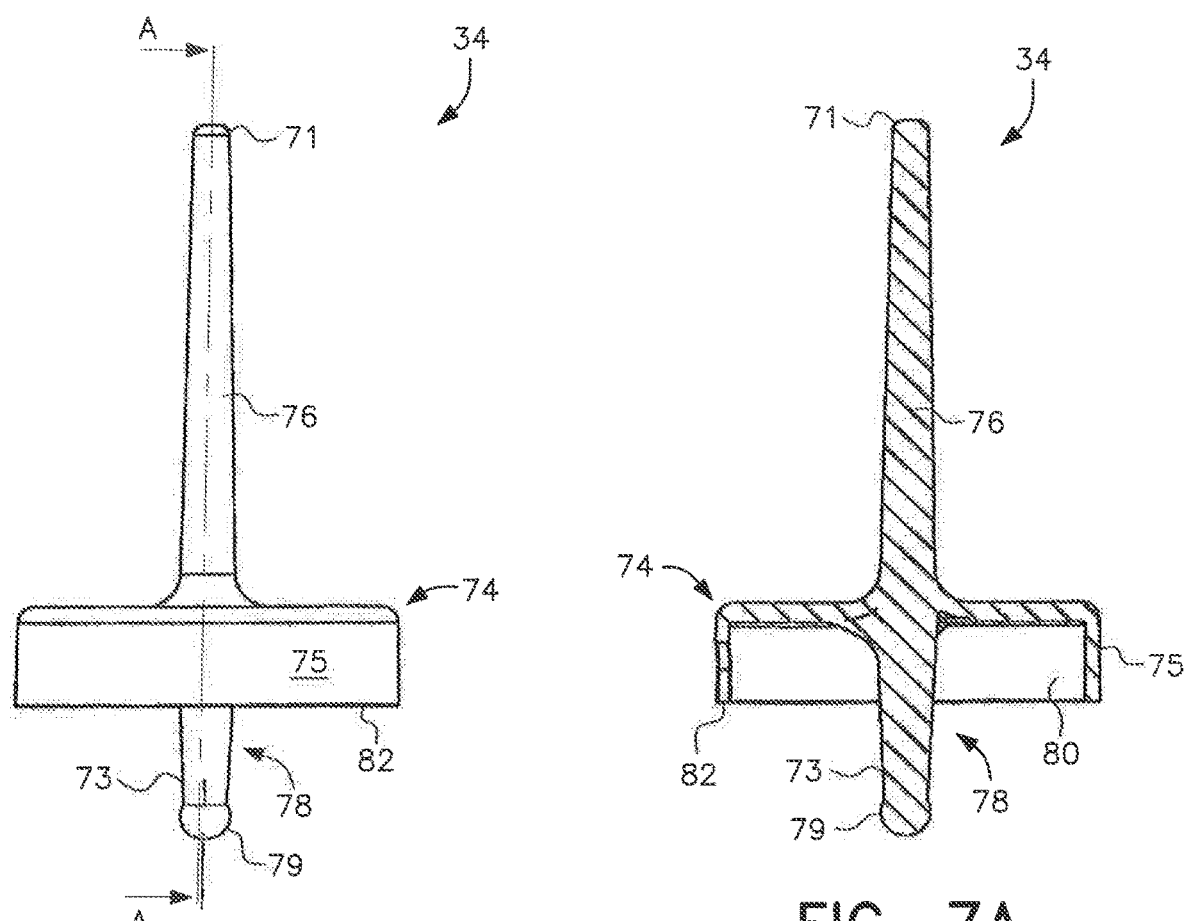
FIG. 7 is a side view of the citrus spear auxiliary food dispensing attachment shown on the feeder illustrated in FIG. 1A.
FIG. 7A is a cut-away view of the citrus spear taken along line A-A of FIG. 7.
Figure 8:
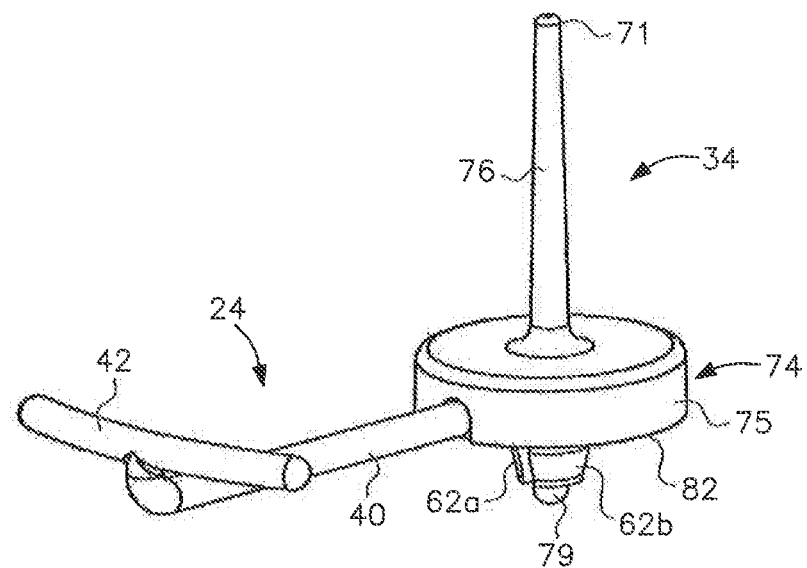
FIG. 8 is a perspective view of the citrus slice spear and port/perch assembly shown on the feeder illustrated in FIG. 1A.
Figure 8A:
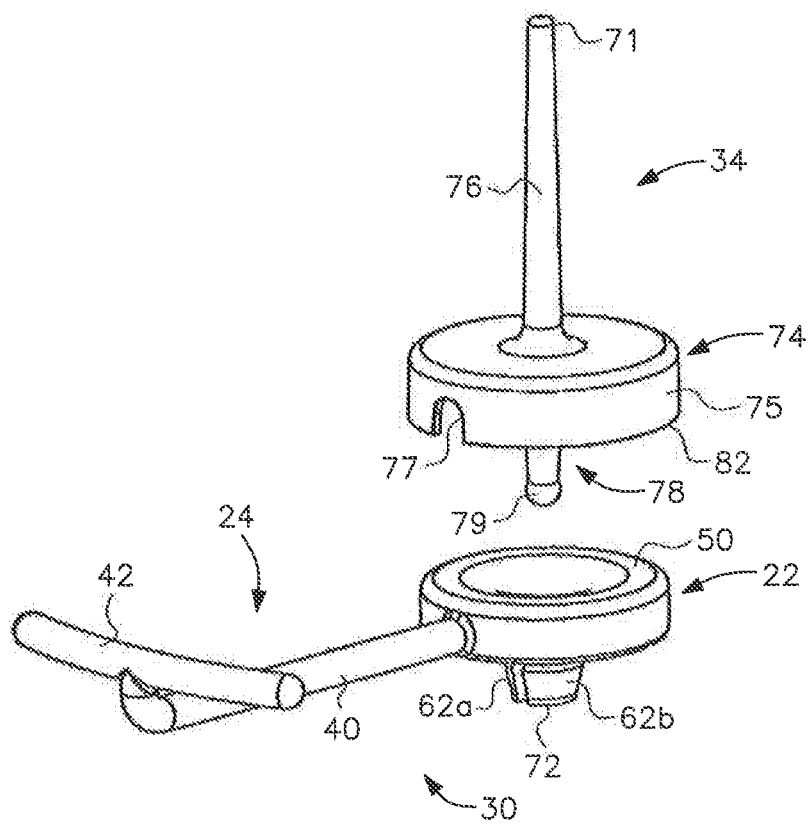
FIG. 8A is a perspective exploded view of the citrus spear and the port/perch assembly shown in FIG. 8.
Figure 9:
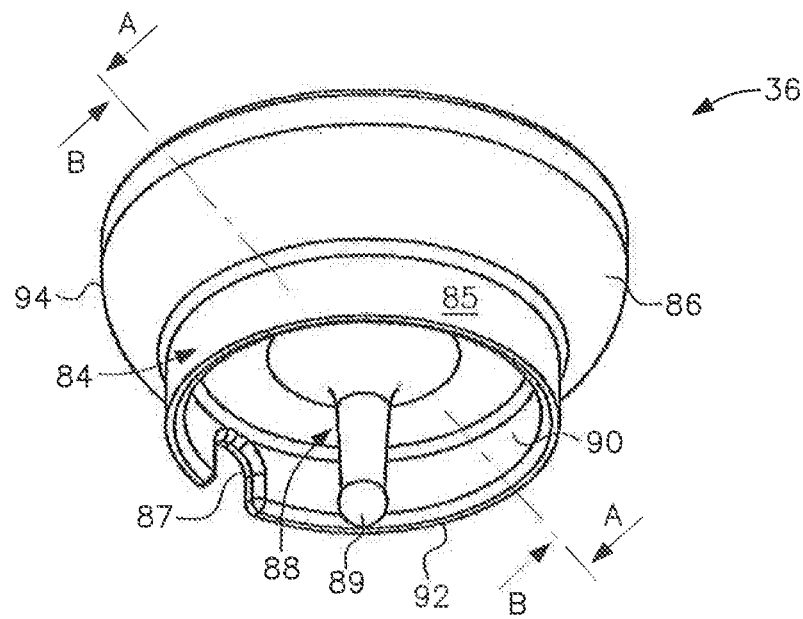
FIG. 9 is a lower perspective view of the jelly cup auxiliary food dispensing attachment shown on the feeder illustrated in FIG. 1A.
Figure 9A:
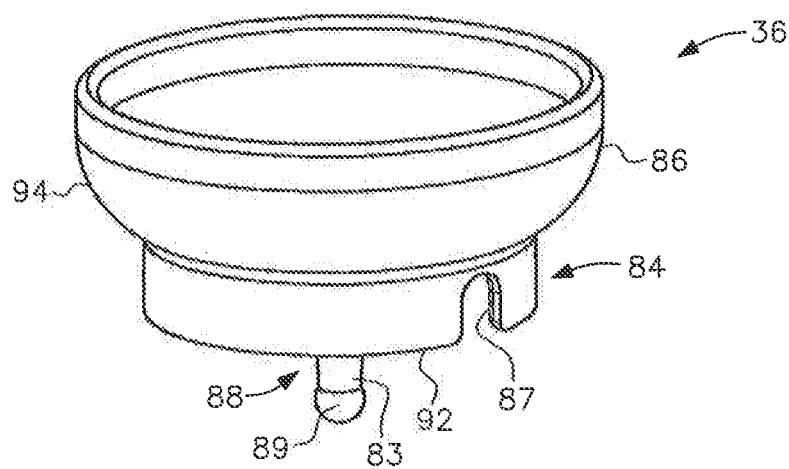
FIG. 9A is an upper perspective view of the jelly cup shown in FIG. 9.
Figure 9B:
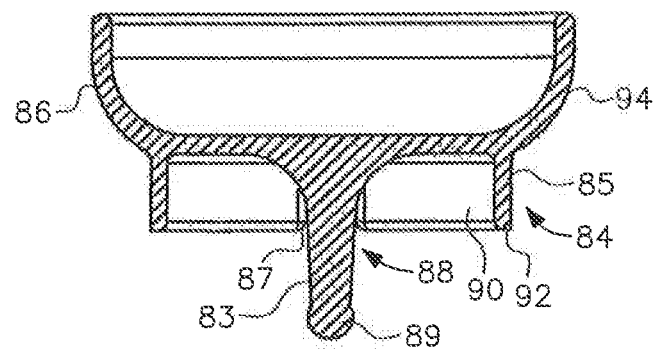
FIG. 9B is a cut-away view of the jelly cup taken along line A-A of FIG. 9.
Figure 9C:
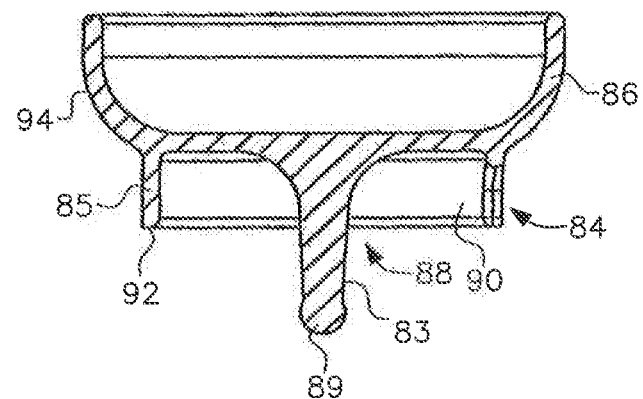
FIG. 9C is a cut-away view of the jelly cup taken along line B-B of FIG. 9.
Figure 10:
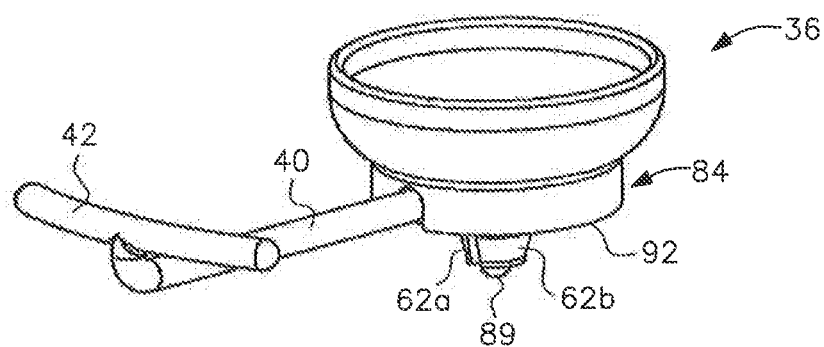
FIG. 10 is a perspective view of the jelly cup and port/perch assembly shown on the feeder illustrated in FIG. 1A.
Figure 10A:
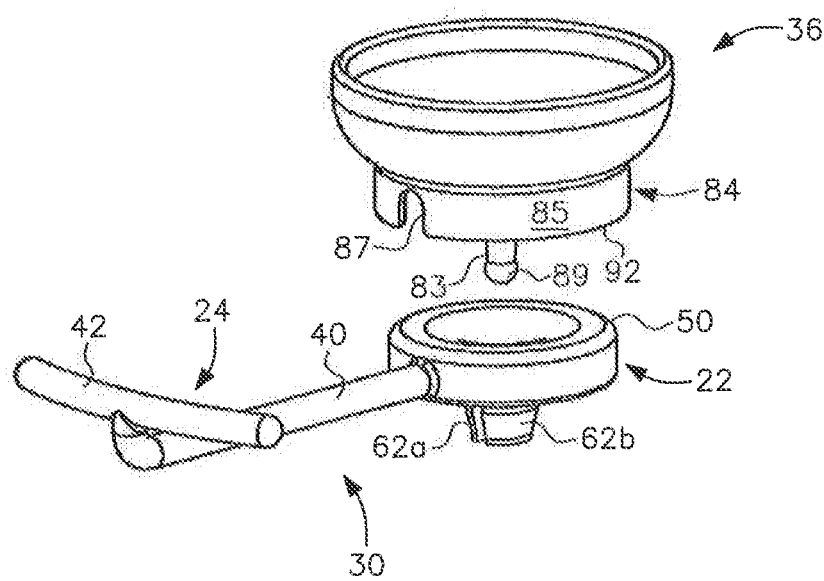
FIG. 10A is a perspective exploded view of the jelly cup and port/perch assembly shown in FIG. 10.

The feeder shown in FIGS. 1-5 includes four ports. In FIGS. 2-4, two of the ports have been used as base mounting elements for auxiliary food dispensing attachments 32 which include a citrus spear 34, shown in isolation in FIGS. 7 and 7A and in assembled and exploded views with a port/perch assembly 30 in FIGS. 8 and 8A, respectively, and a jelly dish 36, shown in isolation in FIGS. 9 and 9A-9E and in assembled and exploded views with a port/perch assembly 30 in FIGS. 10 and 10A, respectively.

The citrus spear 34 includes a cap generally designated by reference numeral 74, an upwardly projecting prong or spear 76, and a downwardly directed connecting element generally designated by reference numeral 78. The cap 74 defines a substantially hollow space 80 (see FIG. 7A) that is sized so that the cap fits over the body 50 of the port element 22 with a lower edge 82 of the cap sidewall 75 being near or in abutment with the top cover 20 of the basin 16 of the base 14 (see FIG. 3). A cutout 77 is formed in the sidewall 75 to fit over the extending member 40 of the perch 24 when the cap is secured to the port element 22. The spear 76 preferably has a diminishing taper toward the upper end 71, but tapering is not necessary. Citrus slices or other food items can be impaled on the spear which then holds the items for bird consumption.

The connecting element 78 protrudes downwardly through the center of the hollow space 80 and projects beyond the lower edge 82 of the sidewall 75 to be received in the center aperture 54 of the port element 22. The distal end 73 of the connecting element 78 preferably has a bulbous tip 79 which, when forced through the inner end 58 of the tapered access passageway 60 and past the bottom edge 72 of the distal end 66, removably secures the citrus spear 34 to the port element 22 with a snap fit.

The jelly dish 36 also includes a cap generally designated by reference numeral 84, an upwardly opening dish 86, and a downwardly directed connecting element generally designated by reference numeral 88. The cap 84 defines a substantially hollow space 90 (see FIGS. 9, 9B and 9C) that is sized so that the cap fits over the body 50 of the port element 22 with a lower edge 92 of the cap sidewall 85 being near or in abutment with the top cover 20 of the feeder base 14. A cutout 87 is formed in the sidewall 85 to fit over the extending member 40 of the perch 24 when the cap 84 is secured to the port element 22. The jelly dish 86 has upwardly directed sides 94 to contain jelly within the dish.

The connecting element 88 protrudes downwardly through the center of the hollow space 90 and projects beyond the lower edge 92 of the sidewall 85 to be received in the center aperture 54 of the port element 22. As with the connecting element 78 of the citrus spear 34, the distal end 83 of the connecting element 88 of the jelly dish 86 preferably has a bulbous tip 89 which, when forced through the inner end 58 of the tapered access passageway 60 and past the bottom edge 72 of the distal end 66, removably secures the jelly dish to the port element 22.

The present invention further includes a method of using an Oriole feeder as described herein, including the cleaning and assembly thereof. According to the method, a plurality of port elements 22 are mounted to the feeder base 14 through snap-fit insertion of the port elements within the mounting apertures 18 in the top cover 20 of the basin 16. As desired, one or more auxiliary food dispensing attachments 32 may be secured to respective port elements 22 through snap-fit insertion of the connecting element 78, 88 of the auxiliary food dispensing attachment 32 into the center aperture 54 in the port element 22.

When the feeder 10 is to be cleaned, the user applies an upward force to each auxiliary food dispensing attachment 32 to disconnect the same from the port element 22. The relief cut 63 in the wall 62 allows the two sides 62a, 62b at the distal end 66 of the body 50 to spread apart from one another sufficiently to allow the bulbous tip 79, 89 of the connecting element 78, 88 of the attachment 32 to move past the bottom edge 72 of the distal end 66 and into the tapered access passageway 60.

Similarly, the port elements 22 are disengaged from the mounting apertures 18 in cover 20 of the base 14 through the application of upward force. The two sides 62a, 62b of the wall 62 at the distal end 66 are resilient enough to be pressed against one another when forced into the aperture 18 in response to the upward force, disengaging the ridge 70 from the underside of the top cover 20 on the basin 16 and allowing the port element 22 to be pulled out of the mounting aperture 18.

To reassemble the feeder, the distal end 66 of the port element 22 is pushed into the mounting aperture 18, compressing the two sides 62a, 62b of the wall 62 at the distal end 66 toward one another until the ridge 70 is positioned against the underside of the top cover 20 and the shank 65 is positioned in the mounting aperture 18. Any desired auxiliary food dispensing attachments 32 may be mounted to respective port elements 22 by pressing the connecting element 78, 88 of the auxiliary food dispensing attachment into the center aperture 54 of the port element body 50 until the bulbous tip 79, 89 of the connecting element is positioned below the bottom edge 72 of the port element distal end 66.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An Oriole bird feeder comprising:
a reservoir for containing nectar;
a base attached to a lower end of said reservoir, said base including a nectar holding basin in communication with the reservoir with a top cover of said basin having at least one port mounting aperture; and
a port element removably attached to said at least one port mounting aperture, said port element having a generally cylindrical inner wall that defines an access passageway through which a bird can access nectar in the nectar holding basin, a distal end of said port element being pushed through the port mounting aperture to secure the port element to the base;
said port element being configured to be used as a base mounting element for an auxiliary food dispensing attachment, said auxiliary food dispensing attachment including a food dispensing structure positioned above the top cover of the basin and a connecting element that is received within the access passageway and coupled to the distal end of the port element wall to removably secure the auxiliary food dispensing attachment to the port element.

2. The Oriole bird feeder as set forth in claim 1, wherein said access passageway is a tapered access passageway of diminishing size, an outer end of said passageway accommodating an Oriole's beak and an inner end of said passageway nearest the nectar holding basin having a smaller size than said outer end to allow the Oriole's tongue to reach in and access nectar in the basin, said smaller size preventing ingress of honey bees into said basin.

3. The bird feeder as set forth in claim 1, wherein the distal end of said port element includes an axially directed relief cut that divides the distal end into at least two sides that are squeezed toward one another when the distal end is pushed through the port mounting aperture to secure the port element to the base.

4. The Oriole bird feeder as set forth in claim 3, wherein an outer surface of said port element distal end includes a projection that is positioned below the top cover of the basin when the port element is attached to the baser the projection preventing the port element from falling out during use.

5. The Oriole bird feeder as set forth in claim 1, wherein said connecting element is secured to the port element with a snap fit.

6. The Oriole bird feeder as set forth in claim 5, wherein said connecting element includes an elongated member with a bulbous distal end that, when pushed through the access passageway past a bottom edge of the port element distal end, secures the auxiliary food dispensing attachment to the port element with the snap fit.

7. The Oriole bird feeder as set forth in claim 5, wherein the food dispensing structure of the auxiliary food dispensing attachment is selected from the group consisting of a citrus spear and a jelly bowl.

8. The Oriole bird feeder as set forth in claim 1, wherein said port element includes an integrated perch to form a port/perch assembly.

9. The Oriole bird feeder as set forth in claim 8, wherein said port/perch assembly is rotatable within said port mounting aperture between an in-use orientation in which the perch extends outwardly from the base, and a storage orientation in which the perch fits inside an outermost footprint of the base and reservoir.

10. The Oriole bird feeder as set forth in claim 9, wherein the perch extends between about 1.5 inches and about 2.0 inches from said base in the in-use orientation but does not break an outermost footprint of the feeder base and reservoir.

11. A bird feeder comprising:
   a reservoir for containing nectar;
   a base attached to a lower end of said reservoir, said base including a nectar holding basin in communication with the reservoir with a top cover of said basin having at least one port mounting aperture; and
   a port/perch assembly that includes a port element and an integrated perch, the port element having a body with a central aperture that defines an access passageway through which a bird can access nectar in the nectar holding basin, said port/perch assembly being removably coupled within said port mounting aperture to secure the assembly to the base; and
   said port/perch assembly being rotatable within said port mounting aperture between an in-use orientation in which the perch extends outwardly from the base, and a storage orientation in which the perch fits inside an outermost footprint of the base.

12. The bird feeder as set forth in claim 11, wherein the perch extends between about 1.5 inches and about 2.0 inches from said base in the in-use orientation but does not break an outermost footprint of the feeder base and reservoir.

13. The bird feeder as set forth in claim 11, wherein said port element body has a downwardly curved, generally cylindrical wall that defines the access passageway, said passageway being tapered so that an opening size in an upper end of said passageway is larger than an opening size in a lower end of said passageway.

14. The bird feeder as set forth in claim 13, wherein an outer surface of said wall distal end includes a projection that is positioned below the base top cover when the port element is attached to the base, the projection preventing the port element from falling out during use.

15. The bird feeder as set forth in claim 14, wherein said port element is configured to be used as a base mounting element for an auxiliary food dispensing attachment, said attachment including a food dispensing structure positioned above the top cover of the basin and a connecting element received within the tapered access passageway and coupled to the port element distal end to removably secure the auxiliary food dispensing attachment to the port element.

16. The bird feeder as set forth in claim 15, wherein said connecting element includes an elongated member with a bulbous distal end that, when pushed through the tapered access passageway past a bottom edge of the port element distal end, secures the auxiliary food dispensing attachment to the port element with a snap fit.

17. The bird feeder as set forth in claim 15, wherein the food dispensing structure of the auxiliary food dispensing attachment is selected from the group consisting of a citrus spear and a jelly bowl.

18. The bird feeder as set forth in claim 13, wherein a distal end of said wall has an axially directed relief cut that divides the wall into two sides that are squeezed toward one another when the distal end is pushed through the port mounting aperture to secure the port element to the base.

19. A method of assembling and disassembling a bird feeder configured to dispense nectar and other food items comprising the steps of:
   providing a bird feeder having a base that includes a basin with a top cover having a mounting aperture therein;
   mounting a port element to the feeder base by inserting a connecting element part of the port element within the mounting aperture in the top cover of the basin for use of the feeder to dispense nectar, the port element including an access passageway through which a bird can access nectar held within the basin, said port element also being configured to mount an auxiliary food dispensing attachment to said basin through coupling at the auxiliary food dispensing attachment to the port element;
   mounting an auxiliary food dispensing attachment to the port element prior to use of the feeder, the auxiliary food dispensing attachment having a lower end with a connecting element and an upper end with a food dispensing element, the auxiliary food dispensing attachment being mounted by pressing the connecting element into the access passageway to secure the auxiliary food dispensing attachment to the port element; and
   when the feeder is to be cleaned, removing the port element from the mounting aperture in the cover of the basin through the application of upward force to pull the port element out or the mounting aperture.

20. The method as set forth in claim 19, further comprising the steps of:
   using the food dispensing element to secure an additional food item adjacent the top cover of the basin upon which birds may feed, said food dispensing element being selected from the group consisting of a citrus spear and a jelly bowl; and
   when the feeder is to be cleaned, applying an upward force to said auxiliary food dispensing attachment to disconnect the same from the port element.

* * * * *